United States Patent
Detor et al.

(10) Patent No.: US 11,203,815 B2
(45) Date of Patent: Dec. 21, 2021

(54) METHODS OF FORMING HIGH-TEMPERATURE ELECTROFORMED COMPONENTS AND RELATED COMPONENTS

(71) Applicant: General Electric Company, Schenectady, NY (US)

(72) Inventors: Andrew Joseph Detor, Burnt Hills, NY (US); Rebecca Louise Casey, Niskayuna, NY (US); Sachin Ananda Nalawade, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 16/589,355

(22) Filed: Oct. 1, 2019

(65) Prior Publication Data
US 2020/0131654 A1    Apr. 30, 2020

Related U.S. Application Data

(60) Provisional application No. 62/749,728, filed on Oct. 24, 2018.

(51) Int. Cl.
*C25D 1/00*   (2006.01)
*B64F 5/10*   (2017.01)

(52) U.S. Cl.
CPC .............. *C25D 1/003* (2013.01); *B64F 5/10* (2017.01)

(58) Field of Classification Search
CPC .............. C25D 1/003; Y10T 29/49043; Y10T 29/49705; Y10T 29/49746; Y10T 29/49888; Y10T 29/4998; Y10T 29/49982
See application file for complete search history.

(56) References Cited

U.S. PATENT DOCUMENTS

| 3,883,402 A | 5/1975 | Malone |
| 7,387,578 B2 | 6/2008 | Palumbo et al. |

(Continued)

FOREIGN PATENT DOCUMENTS

| CN | 1132968 C | 12/2003 |
| CN | 100336940 C | 9/2007 |

(Continued)

OTHER PUBLICATIONS

English translation DE102017003234 (Year: 2017).*

(Continued)

*Primary Examiner* — Jason L Vaughan
*Assistant Examiner* — Amanda Kreiling
(74) *Attorney, Agent, or Firm* — McGarry Bair PC

(57) ABSTRACT

An electroformed composite component includes reinforcing particles in a metal matrix. The composite component is formed by a method including passing an electric current between an anode and a cathode in the presence of an electrolyte. The electrolyte includes a metal salt and a plurality of reinforcing particle precursors. The method further includes depositing a composite layer on the cathode, wherein the composite layer includes the metal matrix and the plurality of reinforcing particle precursors dispersed in the metal matrix. An optional heat treatment can be performed subsequently to transform the precursor particles to more stable forms with concomitant improvement in composite material properties.

20 Claims, 4 Drawing Sheets

(56) References Cited

U.S. PATENT DOCUMENTS 8,113,530 B2    2/2012  Pierick et al.
2016/0237581 A1 * 8/2016  Foster .................... C25D 1/00

FOREIGN PATENT DOCUMENTS

| CN | 102146573 B | 5/2013 | | |
|---|---|---|---|---|
| CN | 103526236 A | 1/2014 | | |
| CN | 103436927 B | 7/2016 | | |
| DE | 102017003234 A1 * | 10/2018 | ............. | C23C 30/00 |
| DE | 102017003234 A1 | 10/2018 | | |
| WO | 2016150757 A1 | 9/2016 | | |

OTHER PUBLICATIONS

Hou et al., "Effect of the dispersibility of ZrO2 nanoparticles in Ni—ZrO2 electroplated nanocomposite coatings on the mechanical properties of nanocomposite coatings", Applied Surface Science, vol. 252, Issue 10, pp. 3812-3817, China, Mar. 15, 2006.
Shree, "Ni—al2o3 nanocomposite coatings on stainless steel-304l by electrodeposition technique", International journal of research in technology and management, vol. 1, Issue 2, pp. 17-20, Roorkee, Oct. 2015.
Non-Final Office Action dated Apr. 17, 2019 for U.S. Appl. No. 15/835,762.
Extended European Search Report for corresponding EP Application No. 19204948.4 dated Feb. 10, 2020 (9 pages).
Thais Guimaraes De Lima Rezende et al: "Electrodeposition of Composite Coatings of Cu/AlO(OH) Using Allyl Alcohol as an Additive", Materials Research, vol. 20, No. suppl 2, Sep. 18, 2017 (Sep. 18, 2017), pp. 374-385, XP055661356, BR (12 pages).

* cited by examiner

As Deposited

Heat Treated at 650°C/4h

METHODS OF FORMING HIGH-TEMPERATURE ELECTROFORMED COMPONENTS AND RELATED COMPONENTS

CROSS-REFERENCE TO RELATED APPLICATIONS

This application claims priority to U.S. Provisional Application Ser. No. 62/749,728, filed 24 Oct. 2018 and entitled "Methods of Forming High-Temperature Electroformed Components and Related Components," the entire subject matter of which is hereby incorporated by reference.

BACKGROUND

Embodiments of the disclosure generally relate to methods of forming high-temperature electroformed components. More particularly, embodiments of the disclosure relate to methods of forming composite electroformed components and related components.

Electroforming is an additive manufacturing process where metal parts are formed through electrolytic reduction of metal ions (atom by atom) on the surface of a mandrel (cathode). Electroforming is used to manufacture products across a range of industries including healthcare, electronics, and aerospace. Electroforming manufacturing process offers several advantages. For example, the electroforming process is efficient, precise, scalable, and low-cost, requiring only modest investment in plant and equipment. However, challenges because of limited material options may limit broader application of this technology for advanced structural components. Accordingly, there remains a need for improved methods of manufacturing electroformed components, particularly high-performance structural components.

DRAWINGS

These and other features, aspects, and advantages of the present disclosure will become better understood when the following detailed description is read with reference to the accompanying drawings, wherein.

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise. The terms "disposed inside" or "disposed in" refer to configurations in which at least portion of a component is disposed inside or within a portion of another component and does not necessarily connotate that the entirety of the component needs to be disposed within another component.

Figure 1:
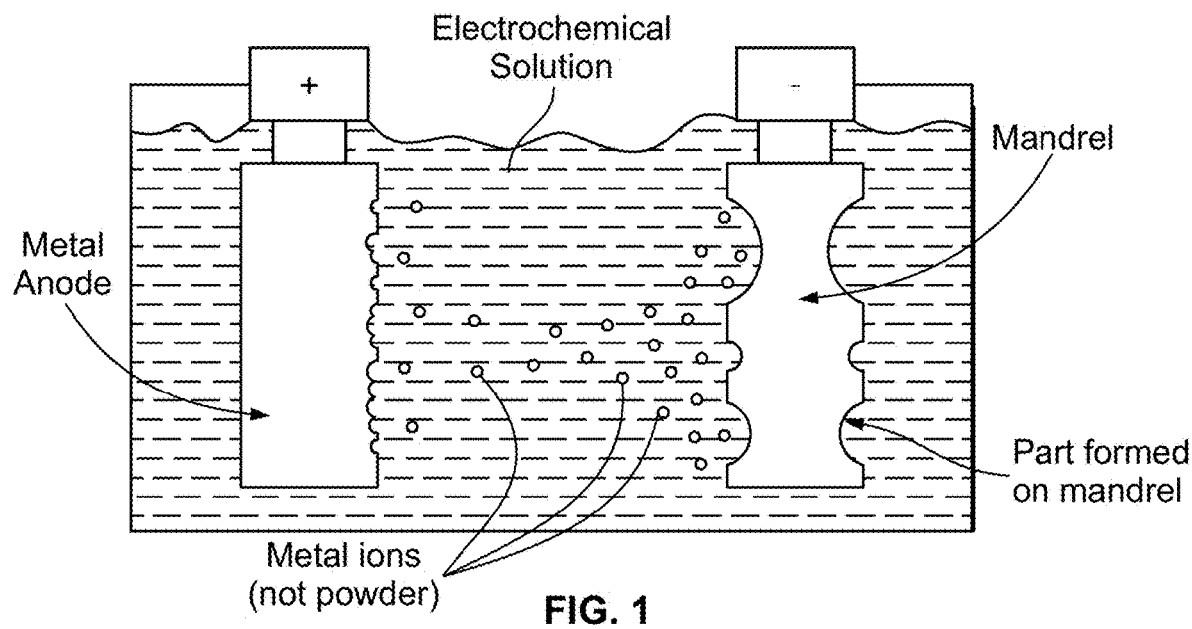
FIG. 1 is a schematic illustration of the electroforming process, in accordance with some embodiments of the disclosure.

As noted earlier, electroforming is an additive manufacturing process where metallic parts are grown on an appropriately shaped mandrel through the electrochemical reduction of metal ions in a liquid solution. FIG. 1 is a schematic illustration of an electroforming process. As shown in FIG. 1, in the electroforming process a mandrel (cathode) and anode are immersed in an electrolyte solution and part thickness builds on the mandrel surface over time as current is passed between the electrodes. Once the desired part thickness is reached the mandrel may be removed by mechanical, chemical, or thermal treatment, yielding a free-standing metal part. In one example, the mandrel can be a low melting point material (i.e. a "fusible alloy") which can be cast into the mandrel shape and subsequently melted out for re-use following electroforming. Other mandrel options include conductive waxes and metallized plastic which can be formed by injection molding, 3D printing, etc. In some cases, a reusable mandrel may also be possible where part geometry allows.

Further, as noted earlier, challenges because of limited material options limit broader application of electroforming technology for advanced structural components. For example, state-of-the art electroforming material options for structural applications are limited to maximum usage temperatures of approximately 500° F. (260° C.). The limited temperature capability of electroformed components is dependent at least in part on the limited set of material options available today for electroforming. Most commercial electroforming operations focus on either pure nickel or copper, and the only alloy commonly available is nickel-cobalt (sometimes with small additions of phosphorous).

This restricted material set is due to fundamental limitations in the electrolytic process. Ideally, an electroforming system should exhibit the following characteristics: high deposition rate (>0.001 in/hr, 0.025 mm/hr), low residual stress (such that no cracks or deformation occur in the part), and high current efficiency (i.e. most of the current passed is used to convert metal ions to solid metal, instead of other side reactions). Translating to electrochemical requirements this means that any metal salt used in the process should desirably have high solubility in water (for conventional processes) and a high standard reduction potential (minimal energy required to reduce the metal cation). Properties of the pure metal (or alloy) should also, of course, be sufficient for the application. Taken together, these requirements result in the restricted set of nickel, copper, and nickel-cobalt materials available today for electroforming. As these materials are all single phase, strength and temperature capability are limited to approximately 100 ksi (690 MPa) ultimate tensile strength (UTS) at 500° F. (260° C.).

Figure 2:
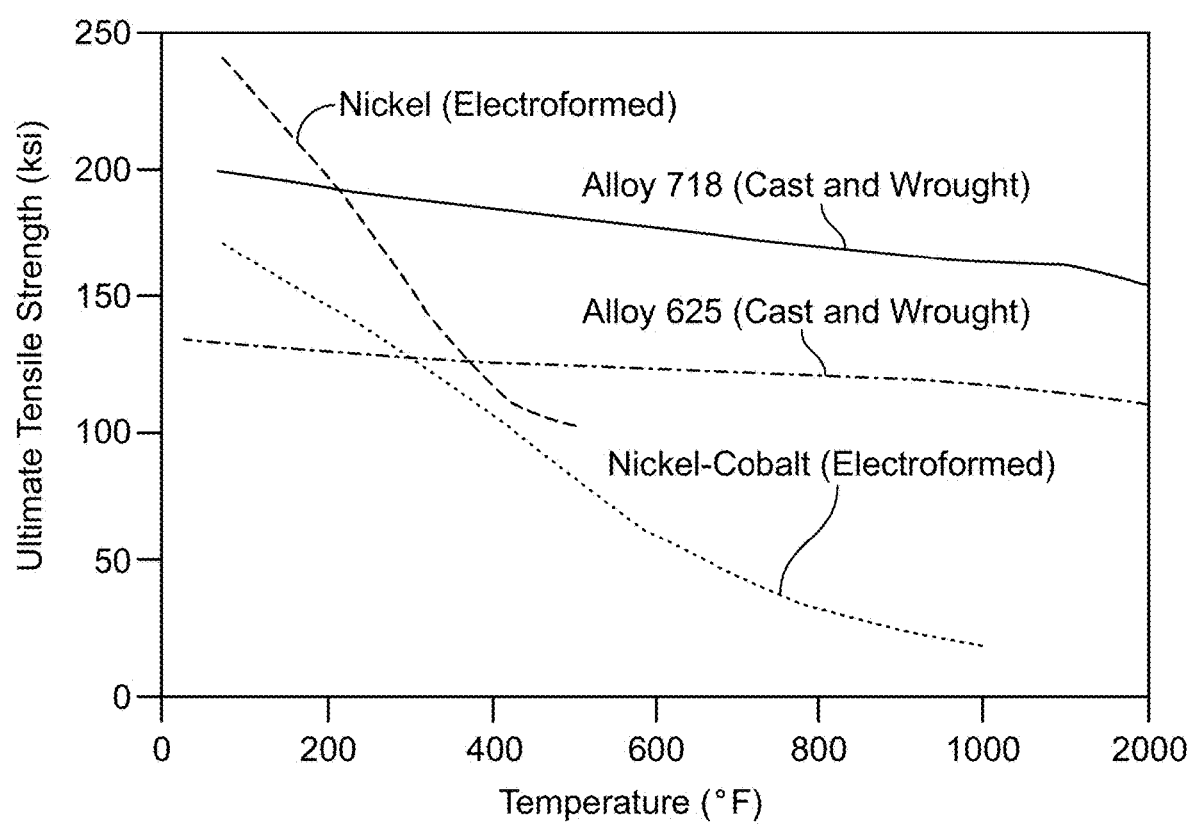
FIG. 2 illustrates ultimate tensile strength as a function of temperature for electroformed and conventional cast and wrought materials.

As mentioned above, the materials set available for structural electroforming is currently limited to nickel and nickel-cobalt alloys. While these metals have reasonable strength at low temperature, both are limited to approximately 500° F. (260° C.) during operation. FIG. 2 demonstrates the rapid decrease in UTS for electroformed nickel and nickel-cobalt materials. In comparison, conventional cast and wrought alloys 625 and 718 exhibiting relatively flat UTS response up to 1200° F. (650° C.). Therefore, new developments in electroforming could enable alloys approaching the strength and temperature stability of conventionally processed Alloys 625 and 718.

Embodiments of the present disclosure address the noted shortcomings in the art. According to some embodiments of the present disclosure, electroforming may be used to additively manufacture parts capable of operating at higher temperatures greater than 500° F. In some embodiments of the present disclosure, electroforming may be used to additively manufacture parts capable of operating at higher temperatures up to or even greater than 1200° F.

Embodiments of the present disclosure address the problems related to the strength and high temperature capability of electroformed components by employing composite materials including reinforcing phases. In this approach, secondary, reinforcing phases are suspended in the electrolyte and incorporated in the growing metal matrix during electroforming. Although the composite plating approach has been explored for electroplated coatings to enhance properties such as wear resistance and lubricity, it has yet to be explored for strengthening structural electroforms.

By incorporating particles (e.g., nanoscale particles) in the metal matrices (e.g., nickel-based matrix), material properties can be improved through a mechanism known as dispersion strengthening. For effective strengthening in structural applications it may be desirable that the particles are stable at the highest expected service operating temperature. Furthermore, the additional particles and phase(s) may be desirably compatible with the matrix material (e.g., nickel-based matrix) up to the highest expected service operating temperature.

In some embodiments, the matrix includes, nickel, copper, cobalt, or combinations thereof. In certain embodiments, the matrix includes nickel, a nickel alloy (such as nickel-tungsten or nickel-molybdenum alloy), or a combination thereof. Such a matrix may be hereinafter referred to as a nickel-based matrix. Further, the plurality of particles may include particles in the form of spherical particles, fibers, tubes, flakes, sheets or combinations thereof. In some embodiments, the plurality of reinforcing particles includes yttria particles, alumina particles, alumina fibers, cerium oxide particles, silica particles, silicon carbide particles, titanium oxide particles, titanium carbide particles, titanium nitride particles, zirconium carbide particles, carbon nanotubes, graphene, or combinations thereof, and their precursors.

For effective strengthening in structural applications it may further be desirable that the additional phase(s) have an appropriate size, volume fraction, and spacing. For example, it may be desirable to have adequate dispersion of the reinforcing particles in the matrix such that the mean free path between particles conforms closely to that of a perfectly uniform distribution with no agglomeration.

The desired particle size and the volume fraction of the particles in the composite can be calculated using the Orowan-Ashby Equation (Equation I), which predicts strengthening due to incoherent particles in a ductile matrix $$\Delta\sigma = \frac{Gbf}{10(1-f)r}\ln\frac{r}{b} \qquad \text{Equation I}$$

Figure 3:
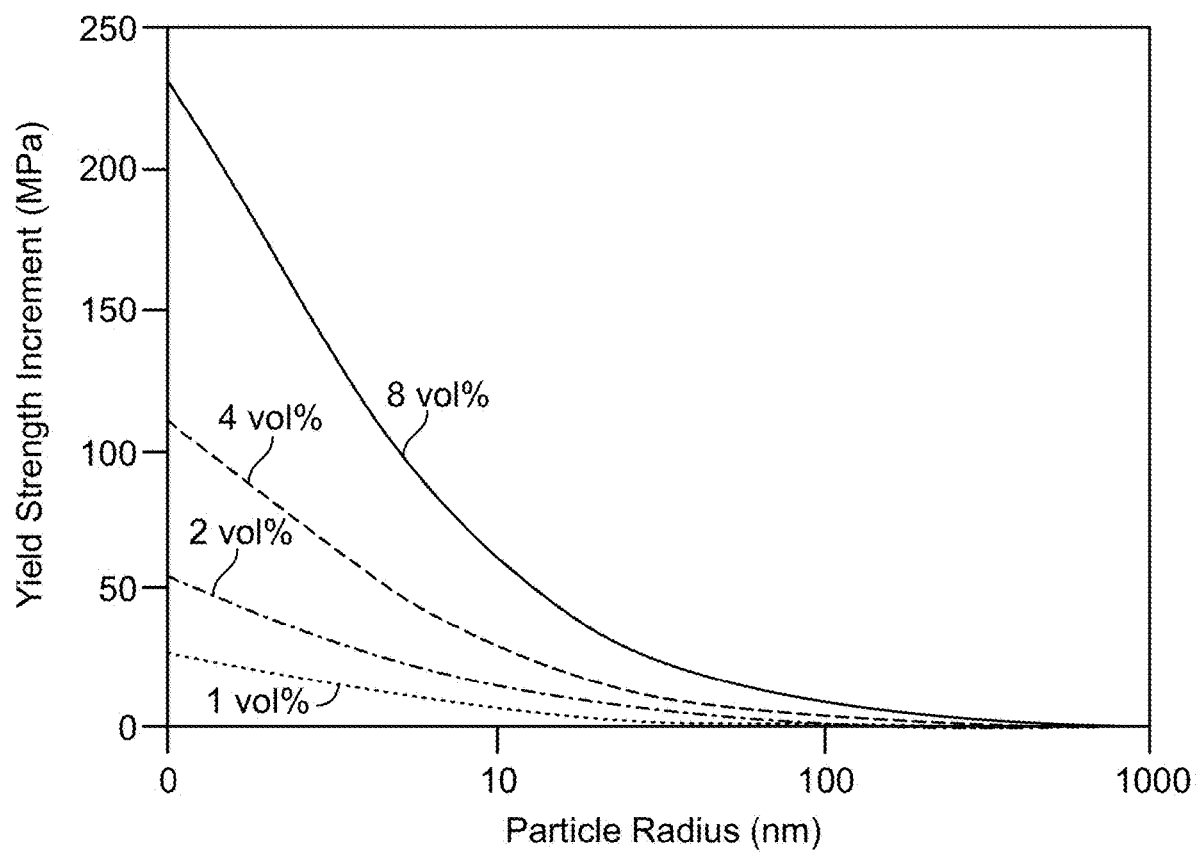
FIG. 3 shows the relationship between the yield strength increment and the particle size (r) and volume fraction (f)

$\Delta\sigma$=yield strength increment, G=shear modulus, b=burgers vector, r=particle size, and f=volume fraction of the particles. This version of the Orowan-Ashby equation assumes the particles are homogeneously dispersed in the matrix with no agglomeration. The relationship between the yield strength increment and the particle size (r) and volume fraction (f) is further illustrated in FIG. 3. As shown in FIG. 3, decreasing particle size (r) and increasing fraction (f) leads to higher strength. Therefore, in accordance with some embodiments of the disclosure smaller particles on the nanoscale (less than about 100 nm) may be desirable. Further, without being bound by any theory it is believed that well dispersed particles may also extend Hall-Petch strengthening by stabilizing grain size at higher temperatures.

Further, in accordance with some embodiments of the disclosure, for homogenously dispersed particles (i.e. substantially no agglomeration), the mean free path between particles, $\lambda$, may be calculated using Equation 2

$$\lambda = \frac{4(1-f)r}{3f} \qquad \text{Equation 2}$$

r=particle size, and f=volume fraction of the particles

Thus, in accordance with embodiments of the disclosure, by employing the correct material microstructure and processing parameters, complex parts may be manufactured via electroforming with wall thicknesses of 0.5 mm or greater, as required for the application, with acceptable strength at high temperatures beyond the capability of existing materials available today.

For example, as mentioned earlier, currently, electroformed components are limited to low or moderate temperature applications below about 500° F. (260° C.). By employing embodiments of the present disclosure, electroforming may be used to additively manufacture parts capable of operating at higher temperatures up to greater than 500° F. and even up to and beyond 1200° F. (650° C.). An electroformed component with this level of temperature capability would enable new and important applications across markets. The inherent advantages of the electroforming process, including low cost and the capability to produce complex geometries, combined with high temperature capability, would open new applications in aerospace, power generation, and other fields.

In some embodiments, a method of forming an electroformed composite component is presented. The method includes passing an electric current between an anode and a cathode in the presence of an electrolyte, wherein the electrolyte includes a metal salt and a plurality of precursors of reinforcing particles. Is some other embodiments, the electrolyte includes a metal salt and precursors of reinforcing particle precursors, for example hydroxide precursors. The hydroxide precursor may be an aluminum hydroxide material, an yttrium hydroxide material, a cerium hydroxide material, a silicon hydroxide material, a titanium hydroxide material, or a combination thereof. The method further includes depositing a composite layer on the cathode, wherein the composite layer includes a matrix of a metal from the metal salt and the plurality of reinforcing particle precursors dispersed in the matrix. In some embodiments, the electrical current is a direct current (DC). In some other embodiments, the electrical current is pulsed according to a prescribed waveform.

Non-limiting examples of a suitable metal salt include a salt of nickel, copper, cobalt, or combinations thereof. In certain embodiments, the metal salt includes a salt of nickel. Non-limiting examples of suitable metal salts include chloride, sulfate, and/or sulfamate salts of the metals. Further, the plurality of particles may include particles in the form of spherical particles, fibers, tubes, flakes, sheets or combinations thereof. In some embodiments, the plurality of reinforcing particles includes yttria particles, alumina particles, alumina fibers, cerium oxide particles, silica particles, silicon carbide particles, titanium oxide particles, titanium carbide particles, titanium nitride particles, zirconium carbide particles, carbon nanotubes, graphene, or combinations thereof, and their precursors.

In some embodiments, the composite layer includes a nickel-based matrix and one or more of yttria particles, alumina particles, alumina fibers, carbon nanotubes, or graphene, dispersed in the nickel-based matrix. In certain embodiments, the composite layer includes a nickel-based matrix and a plurality of Boehmite or alumina particles dispersed in the nickel-based matrix.

As mentioned earlier, for effective strengthening in structural applications it may further be desirable that the additional phase(s), e.g., reinforcing phases have an appropriate size, volume fraction, and spacing. In some embodiments, the plurality of reinforcing particles has an average particle size in a range up to about 100 nm. In some embodiments, the plurality of reinforcing particles has an average particle size in a range from about 2 nm to about 90 nm, from about 5 nm to about 80 nm, from about 10 nm to about 70 nm, from about 15 nm to about 60 nm, from about 20 nm to about 50 nm, and any intervening ranges therein. In certain embodiments, the plurality of reinforcing particles has an average particle size in a range from about 5 nanometers (nm) to about 20 nm. In some embodiments, a volume fraction of the plurality of reinforcing particles in the composite layer is in a range from about 1 vol % to about 20 vol %. In some embodiments, a volume fraction of the plurality of reinforcing particles in the composite layer is in a range from about 1 vol % to about 15 vol %, from about 1.5 vol % to about 12.5 vol %, from about 2 vol % to about 10 vol %, from about 2.5 vol % to about 7.5 vol %, and any intervening ranges therein. In certain embodiments, a volume fraction of the plurality of reinforcing particles in the composite layer is in a range from about 2 vol % to about 10 vol %. In some embodiments, a mean free path between the plurality of particles is in a rage from about 5 nm to about 1000 nm. In some embodiments, a mean free path between the plurality of particles is in a rage from about 5 nm to about 750 nm, from about 5 nm to about 500 nm, from about 10 nm to about 500 nm, from about 10 nm to about 250 nm, from about 10 nm to about 100 nm, from about 10 nm to about 50 nm, and any intervening ranges therein. In certain embodiments, a mean free path between the plurality of particles is in a range from about 10 nm to about 100 nm.

The method further includes depositing a composite layer on the cathode to form the electroformed component having a desired average thickness. In some embodiments, the desired average thickness is greater than 0.5 millimeters. In certain embodiments, the desired average thickness is in a range from about 0.5 millimeters to about 5 millimeters.

As noted earlier, the method in accordance with embodiments of the disclosure may advantageously allow for fabrication of electroformed components having a complex geometry with a substantially uniform thickness. In some embodiments, the electroformed component is a component of an aircraft engine, a gas turbine, or a marine engine. In certain embodiments, the electroformed component comprises aircraft engine conveyance components, tubing, ducting, seals, vanes, airfoils, struts, liners, cases, flow-path structures, leading edges, brackets, flanges, housings.

The electroformed component may have a temperature capability that is greater than 500° F. In certain embodiments, the electroformed component has a temperature capability that is equal to or greater than 1200° F. Electroformed components formed using the methods described herein are also encompassed within the scope of the disclosure.

As also noted earlier, composite plating, also known as entrapment plating, approaches have been explored for electroplated composite coatings to enhance properties such as wear resistance and lubricity. However, these approaches to composite plating have been focused on coatings which are relatively thin, for example up to 100 μm thick. The coating is applied to a substrate material for improving wear resistance, corrosion protection, lubricity, oxidation resistance, etc. Formulations used in coating applications typically contain a dispersant to keep the particles suspended in the plating bath and prevent particle agglomeration. The dispersant helps to incorporate the particles uniformly and well dispersed in the electrodeposit rather than agglomerated or clumped together. Dispersants commonly used include polyethyleneimine (PEI) and cetrimonium bromide (CTAB). Although these approaches using dispersants can provide high quality coatings they tend to increase residual stress in the deposit (by interfering with reduction of the metal in the metal salt), thus preventing thicker deposits, e.g. greater than 100 μm, that would be required to electroform stand-alone structural parts which may require a thickness of, for example, greater than 0.5 mm, for example 1.0 mm or thicker. Dispersants also inevitably become entrapped in the deposit which can negatively affect the properties of the deposit. For high temperature stand-alone structural components entrapment of dispersants may limit the maximum use temperature and other mechanical properties, such as the UTS.

The inventors realized that in order to form stand-alone structural components having a thickness of, for example 0.5 mm to 1.0 mm or thicker, it is advantageous to not include dispersants or surfactants in the electrochemical solution. However, the need to achieve good particle dispersion in the electroforming bath remains. In order to form stand-alone structural components having the required maximum use temperature, UTS, and other mechanical properties, the inventors found that one way to achieve good particle dispersion is to use a precursor of the target particle that is desired in the final structural electroform. The precursor should be inherently stable and well-dispersed in suspension.

As noted earlier, the reinforcing particles in the metal matrix of the electroformed composite component may include yttria particles, alumina particles, alumina fibers, cerium oxide particles, silica particles, silicon carbide particles, titanium oxide particles, titanium carbide particles, titanium nitride particles, zirconium carbide particles, carbon nanotubes, graphene or combinations thereof. The inventors found that using particles of precursors to the reinforcing particles resulted in inherently stable and well-dispersed suspensions that provided good dispersion of the reinforcing particles in the electroformed composite component.

As one example, Boehmite, also known as amorphous alumina or hydrous aluminum oxide or aluminum oxide hydroxide, having the chemical formula AlO(OH), was used as a precursor of alumina particles. Boehmite is highly self-dispersable in aqueous (water-based) solutions due to the presence of the OH groups. The inventors found that Boehmite is also highly self-dispersable in electrolytes suitable for electroforming, including chloride, sulfate, and/or sulfamate-based baths of nickel, copper, and nickel-cobalt. Compared to suspensions including pure gamma ($\gamma$) phase or alpha ($\alpha$) phase alumina ($Al_2O_3$) the suspension including Boehmite is stable indefinitely, which is a prerequisite for production. The stability of the suspensions including Boehmite was tested by keeping the suspensions stirring for a plurality of weeks. It was found that the suspensions including Boehmite did not tend to agglomerate, whereas suspensions including pure gamma ($\gamma$) phase or alpha ($\alpha$) phase alumina tended to show signs of agglomeration. The Boehmite particles were also readily incorporated into the metal matrix of the electroformed composite component during electroforming.

EXAMPLE

The example that follows is merely illustrative and should not be construed to be any sort of limitation on the scope of the claimed inventions. Unless specified otherwise, all ingredients are commercially available from common chemical suppliers.

Figure 4:
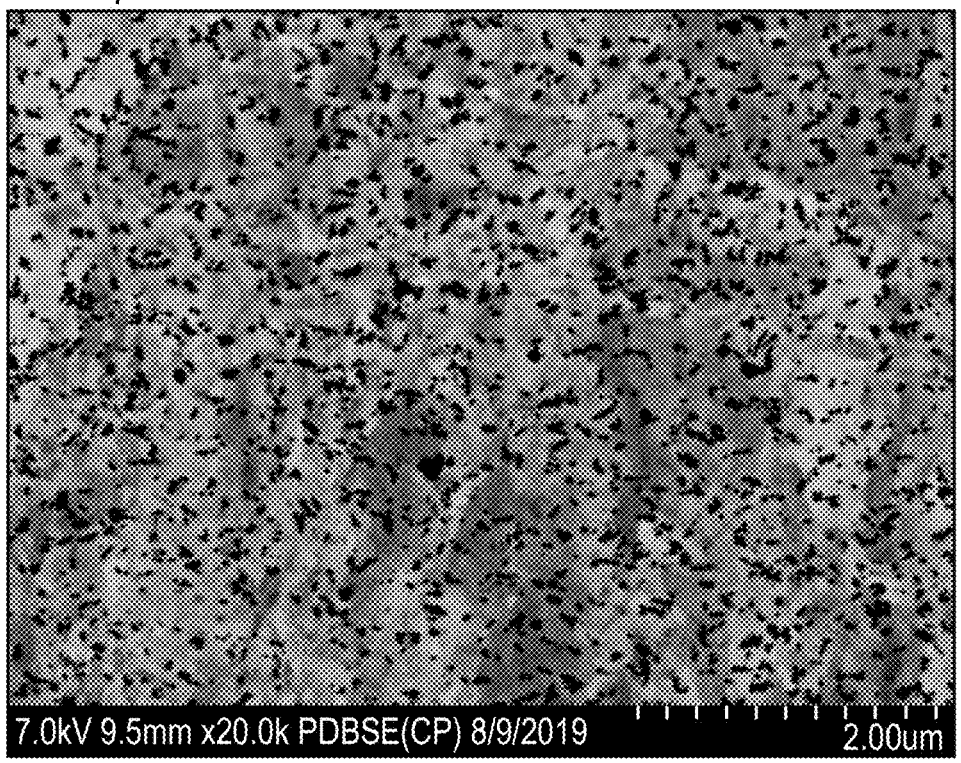
FIG. 4 shows ~50 nm diameter Boehmite (AlO(OH)) particles in a polycrystalline nickel matrix produced through a composite electroforming approach, in accordance with some embodiments of the disclosure.
Figure 6:
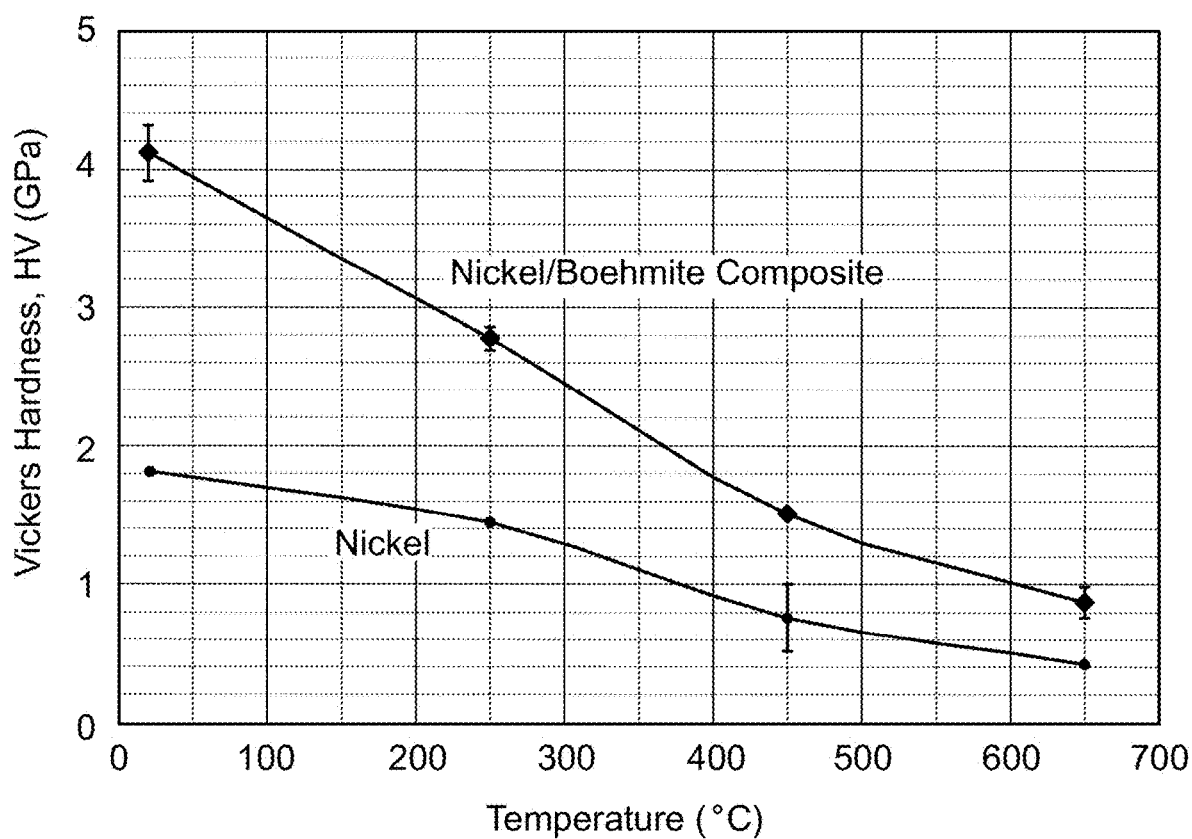
FIG. 6 shows the hot hardness testing results for composite electroformed components, in accordance with some embodiments of the disclosure.

Electroforming of nickel/alumina nanocomposites was demonstrated using Boehmite particles having an average size of about 50 nm in a nickel sulfate based electroforming bath chemistry. The bath consisted of approximately 300 g/L of Nickel Sulfamate, $Ni(SO_3NH_2)_2$, 30 g/L of Nickel Chloride, $NiCl_2$, 60 g/L of Boric acid, $H_3BO_3$, with 50 g/L of 50 nm Boehmite particles added to form a suspension. A total volume of 2 L was mixed and heated to 60° C. while continuously stirring with an overhead stirrer in an ultrasonic water bath. An activated nickel anode and stainless steel cathode were immersed in the bath and a direct current density of 50 mA/cm$^2$ was applied for 20 hours to build up approximately 0.5 mm thick coupons measuring 2 cm wide by 5 cm long. The micrograph in FIG. 4 shows the material structure of a typical coupon—a polycrystalline nickel matrix containing darker Boehmite particles. The material structure shown in FIG. 4 includes approximately 3%-4% (by area) incorporation of the 50 nm Boehmite particles in the polycrystalline nickel matrix as deposited on the cathode. The particles inherently strengthen the electroformed composite component by inhibiting dislocation motion and stabilizing the fine grain structure. Hot hardness testing showed a benefit relative to pure nickel baseline sample (representing today's state-of-the-art). FIG. 6 shows the Vickers Hardness (Hv) in GPa of the material structure of FIG. 4. Further property improvements may be achieved by improving dispersion, including finer particles, increasing particle volume fraction, or using other particle types.

Figure 5:
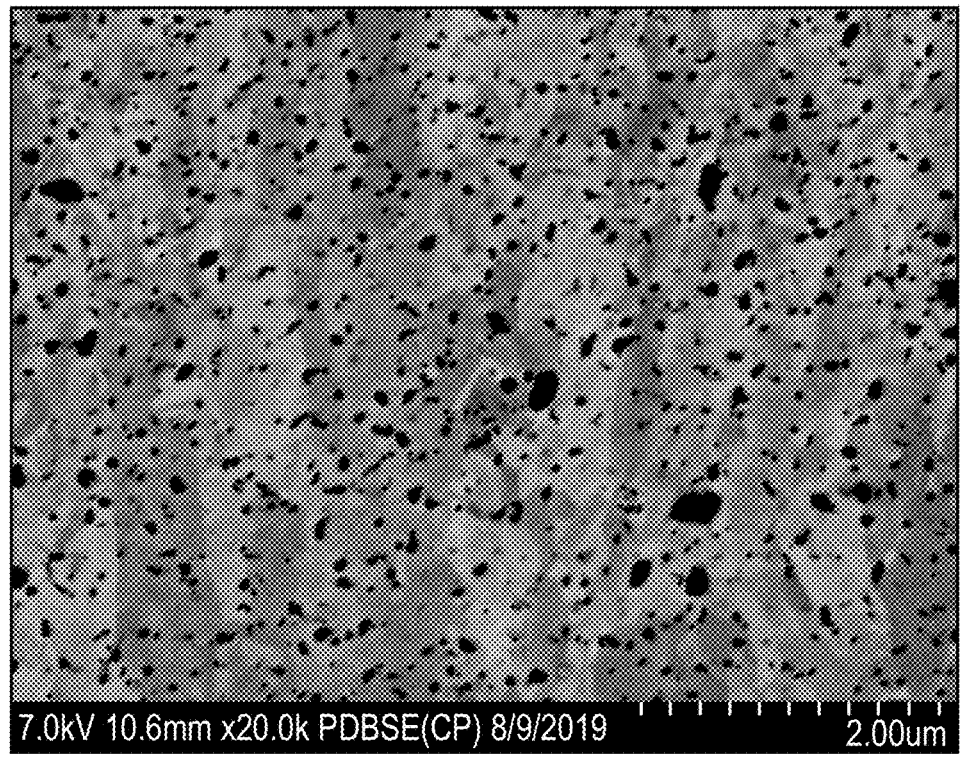
FIG. 5 shows the structure of FIG. 4 after a heat-treatment.

The as-deposited structure of FIG. 4 may be subjected to an optional heat-treatment to convert the Boehmite into other, more stable, harder forms of alumina. Although conversion of Boehmite into various alumina phases is known and well documented in the ceramics community, it is a new practice to convert Boehmite as a strengthening particle in a metal matrix composite produced by electroforming, and FIG. 5 is a micrograph of the structure obtained by heat treating the as-deposited structure of FIG. 4 at 650° C. (1200° F.) for four hours.

The first conversion of Boehmite occurs around 500-550° C. The Boehmite is transformed to gamma alumina ($\gamma$-$Al_2O_3$) by the reaction $2AlO(OH) \rightarrow \gamma$-$Al_2O_3 + H_2O$. The water produced by the reaction is likely a mix of $H_2$, OH, and $H_2O$ and can be extracted from the material using a vacuum heat-treat. As shown in FIG. 5, the heat-treated structure has a particle morphology that is slightly changed from the as-deposited structure of FIG. 4. Some coalescing and smoothing occurs during the transformation.

Further heat-treating the structure shown in FIG. 5 at higher temperatures, for example 1100° C. (2010° F.), can convert the $\gamma$-$Al_2O_3$ to other phases, including, in order, delta, theta, and finally alpha alumina ($\alpha$-$Al_2O_3$) which is the most stable and hardest form. The conversion of $\gamma$-$Al_2O_3$ to $\alpha$-$Al_2O_3$ results in a greater than 10% reduction in volume of the reinforcing particles. This adds to the strengthening effect of the particles by introducing local strain fields in the material that further interact with and hinder dislocation motion. The intermediate delta and/or theta phases may also provide enhanced strength and thermal stability beyond $\gamma$-$Al_2O_3$, and precise heat treatments may be tuned to tailor the composite materials strength, ductility, and other properties derived from particle transformations.

Although the EXAMPLE discloses the use of Boehmite as a suitable precursor, other precursor materials may be used depending on the desired reinforcing phase in the final composite material. For example, a composite structure may be formed using yttrium hydroxide ($Y(OH)_3$). Other reinforcing materials disclosed herein include cerium oxide particles, silica particles, silicon carbide particles, titanium oxide particles, titanium carbide particles, titanium nitride particles, zirconium carbide particles, carbon nanotubes, graphene or combinations. Any precursor of the reinforcing material(s) that is stable and easily dispersed in the electroforming solution may be used.

As disclosed herein, forming an electroformed composite component may be achieved by using a surfactant and/or dispersant free electrolyte solution. As such, the electrolyte solution may consist, or consist essentially, of a metal salt and a precursor. Although additional elements or compounds, including surfactants and/or dispersants, may be present in the electrolyte solution such amounts should beat trace or insubstantial levels so as not to increase residual stress in the component as it is formed up to and beyond, for example, 0.5 mm and/or limit maximum use temperature below, for example, 500° F. and/or limit other mechanical properties, for example UTS below 100 ksi.

The appended claims are intended to claim the inventions as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises", and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A method of forming an electroformed composite component, the electroformed composite component comprising reinforcing particles in a metal matrix, the method comprising:
    passing an electric current between an anode and a cathode in the presence of an electrolyte, wherein the electrolyte comprises a metal salt and a plurality of reinforcing particle precursors, wherein a mean free path between the plurality of reinforcing particle precursors is in a range from about 5 nanometers to about 1000 nanometers; and
    depositing a composite layer on the cathode, wherein the composite layer comprises the metal matrix and the plurality of reinforcing particle precursors dispersed in the metal matrix.

2. The method of claim 1, further comprising performing a first heat-treatment of the electroformed composite component to transform the plurality of reinforcing particle precursors to more stable phases of the reinforcing particles.

3. The method of claim 2, wherein the first heat-treatment is performed in a vacuum.

4. The method of claim 2, further comprising performing a second heat-treatment after the first heat-treatment to transform the reinforcing particles to another phase.

5. The method of claim 4, wherein the second heat-treatment is performed at a higher temperature than the first heat-treatment.

6. The method of claim 2, wherein the first heat-treatment comprises heating the electroformed composite component at a temperature equal to or greater than a transformation temperature of the plurality of reinforcing particle precursors for a time sufficient to complete a transformation of the plurality of reinforcing particle precursors to a more stable phase of the reinforcing particles.

7. The method of claim 1, wherein the metal salt comprises a salt of nickel, copper, cobalt, or combinations thereof.

8. The method of claim 1, wherein the plurality of reinforcing particle precursors comprise hydroxide precursors of the reinforcing particles.

9. The method of claim 1, wherein the plurality of reinforcing particle precursors comprises precursors of alumina particles, yttria particles, alumina fibers, cerium oxide particles, silica particles, titanium oxide particles, or combinations thereof.

10. The method of claim 1, wherein the plurality of reinforcing particle precursors comprises an aluminum hydroxide material, an yttrium hydroxide material, a cerium hydroxide material, a silicon hydroxide material, a titanium hydroxide material, or combinations thereof.

11. The method of claim 1, wherein average particle size of the plurality of reinforcing particle precursors is less than about 100 nanometers.

12. The method of claim 1, wherein a volume fraction of the plurality of reinforcing particles in the composite layer is in a range from about 2 volume % to about 10 volume %.

13. An electroformed component formed using the method of claim 1.

14. The method of claim 1, wherein the composite layer comprises a nickel-based matrix and the plurality of reinforcing particle precursors comprise one or more of alumina particles, yttria particles, alumina fibers, or a combination thereof dispersed in the nickel-based matrix.

15. The method of claim 1, wherein the composite layer comprises a nickel-based matrix and a plurality of Boehmite particles dispersed in the nickel-based matrix.

16. The method of claim 1, comprising depositing the electroformed composite component on a mandrel to have a desired average thickness from about 0.5 millimeters to about 5 millimeters.

17. The method of claim 1, wherein the electroformed composite component is a component of an aircraft engine.

18. The method of claim 1, wherein the electroformed composite component comprises aircraft engine conveyance components, tubing, ducting, seals, vanes, airfoils, struts, liners, cases, flow-path structures, leading edges, brackets, flanges, housings.

19. The method of claim 1, wherein the electroformed composite component has a service temperature capability that is greater than 500° F.

20. The method of claim 1, wherein the electroformed composite component has a service temperature capability that is equal to or greater than 1200° F.

* * * * *